US007478970B2

(12) United States Patent
Wimberley

(10) Patent No.: US 7,478,970 B2
(45) Date of Patent: Jan. 20, 2009

(54) SHAFT CLAMPING MECHANISM

(76) Inventor: David L. Wimberley, 974 Baker La., Winchester, VA (US) 22603

( * ) Notice: Subject to any disclaimer, the term of this patent is extended or adjusted under 35 U.S.C. 154(b) by 0 days.

(21) Appl. No.: 11/645,912

(22) Filed: Dec. 27, 2006

(65) Prior Publication Data
US 2007/0163059 A1 Jul. 19, 2007

Related U.S. Application Data

(60) Provisional application No. 60/755,805, filed on Jan. 3, 2006.

(51) Int. Cl.
F16B 2/14 (2006.01)
(52) U.S. Cl. .................... 403/374.2; 403/367
(58) Field of Classification Search ............. 403/88, 403/109.1, 109.5, 110, 203, 366, 367, 372, 403/374.1, 374.2
See application file for complete search history.

(56) References Cited

U.S. PATENT DOCUMENTS

| 298,398 | A | * | 5/1884 | Osborn ................. 403/309 |
| 3,466,922 | A | | 9/1969 | Phillips, Jr. |
| 3,473,202 | A | | 10/1969 | Howard |
| 3,598,432 | A | * | 8/1971 | Walker ................. 403/366 |
| 3,600,013 | A | * | 8/1971 | Doering, Jr. ............ 403/366 |
| 3,738,691 | A | | 6/1973 | Firth |
| 3,868,193 | A | | 2/1975 | Schott |
| 3,876,318 | A | | 4/1975 | Crispell |
| 3,917,424 | A | | 11/1975 | Zugel |
| 4,116,572 | A | | 9/1978 | Heldmann |
| 4,142,811 | A | * | 3/1979 | Burnham ............... 403/290 |
| 4,207,668 | A | | 6/1980 | Previte |
| 4,217,061 | A | | 8/1980 | Eiland |
| 4,428,697 | A | | 1/1984 | Ruland |
| 4,565,464 | A | | 1/1986 | Nilsson |
| 4,620,814 | A | * | 11/1986 | May ..................... 403/314 |
| 4,923,326 | A | * | 5/1990 | Fietzke ................. 403/371 |
| 4,969,923 | A | * | 11/1990 | Reeder et al. ........... 285/365 |
| 4,981,389 | A | * | 1/1991 | Keon ................... 403/290 |
| 5,042,826 | A | | 8/1991 | Garnett |
| 5,044,816 | A | * | 9/1991 | Junkes ................. 403/344 |
| 5,062,734 | A | | 11/1991 | Vanzee |

(Continued)

FOREIGN PATENT DOCUMENTS

WO    WO 2004113739 A1 * 12/2004

Primary Examiner—Daniel P Stodola
Assistant Examiner—Joshua T Kennedy
(74) Attorney, Agent, or Firm—Robert Platt Bell

(57) ABSTRACT

The shaft clamping mechanism clamps a cylindrical shaft such that it will not rotate in a housing. Using ordinary machine tools or the like, portions of the housing that surround the shaft are removed, leaving thin areas that act as hinges. The housing may not be cut all the way through so that the hinged or moving portion of the housing that exerts the clamping force is contiguous with the rest of the housing. Applying force in a plane perpendicular to the axis of the shaft, toward the shaft, in the middle of this hinged portion allows that part of the housing to move very slightly. The housing and shaft may be a close fit so that only a slight amount of movement of the moving part of the housing will be required to clamp the shaft. In order for this mechanism to work, the housing material has to flex slightly at the "hinges". The stationary portions of the housing must also deflect very slightly.

22 Claims, 6 Drawing Sheets

U.S. PATENT DOCUMENTS

| | | | |
|---|---|---|---|
| 5,067,845 A * | 11/1991 | Schlueter | 403/344 |
| 5,096,327 A | 3/1992 | Ruland | |
| 5,158,407 A | 10/1992 | Zettl | |
| 5,306,096 A | 4/1994 | Tuns | |
| 5,318,375 A | 6/1994 | Entrup | |
| 5,407,296 A * | 4/1995 | Brown | 403/383 |
| 5,810,503 A | 9/1998 | Schlanger | |
| 5,851,084 A | 12/1998 | Nishikawa | |
| 5,857,800 A | 1/1999 | Nell | |
| 6,216,330 B1 * | 4/2001 | Valin | 29/525 |
| 6,390,721 B1 * | 5/2002 | Wilson et al. | 403/312 |
| 6,413,006 B1 | 7/2002 | Neugart | |
| 6,631,543 B2 * | 10/2003 | Retzbach | 29/450 |
| 6,840,701 B2 | 1/2005 | DaCunha | |
| 6,893,185 B1 * | 5/2005 | Wood | 403/374.4 |
| 7,300,210 B2 * | 11/2007 | Johnson et al. | 384/537 |
| 2002/0040953 A1 * | 4/2002 | Linnenbuerger | 248/74.1 |
| 2004/0037626 A1 | 2/2004 | Awtar | |
| 2005/0169700 A1 * | 8/2005 | Moore | 403/109.5 |

* cited by examiner

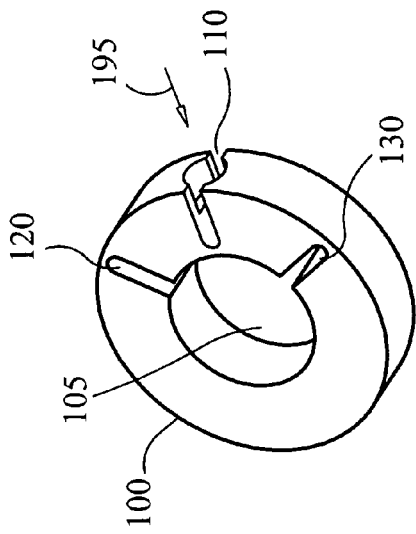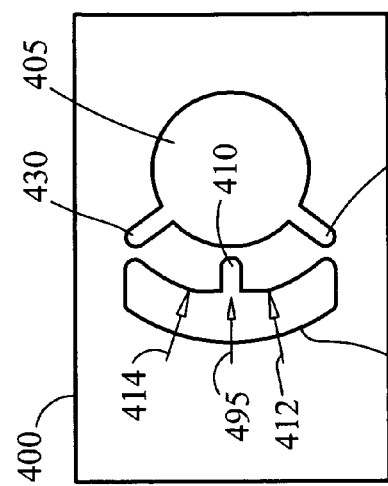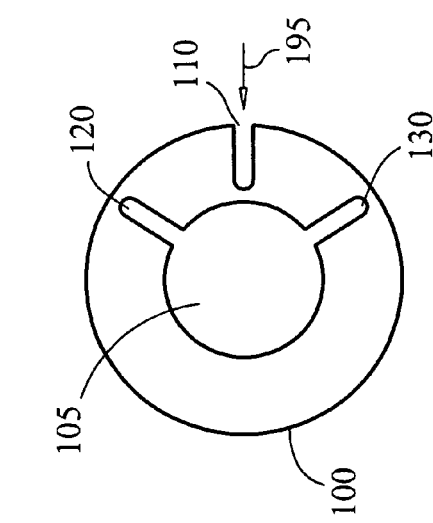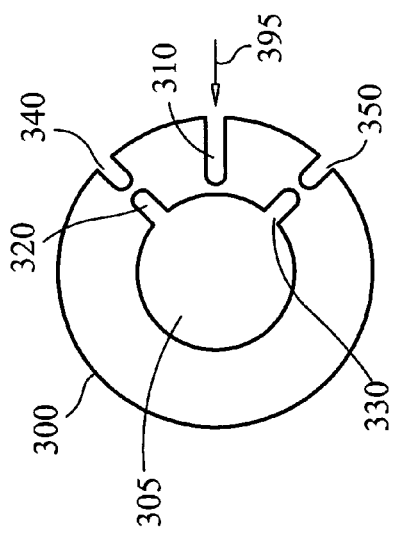

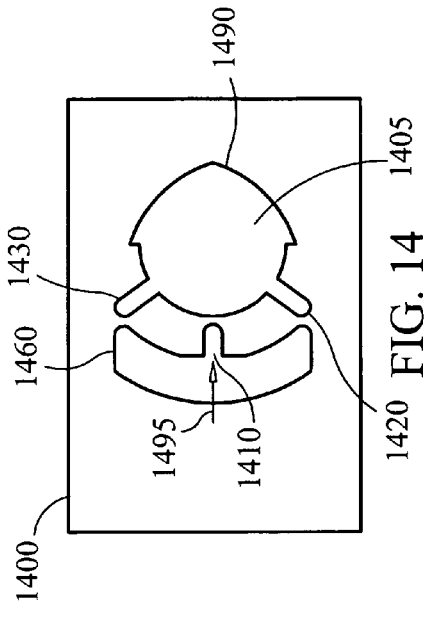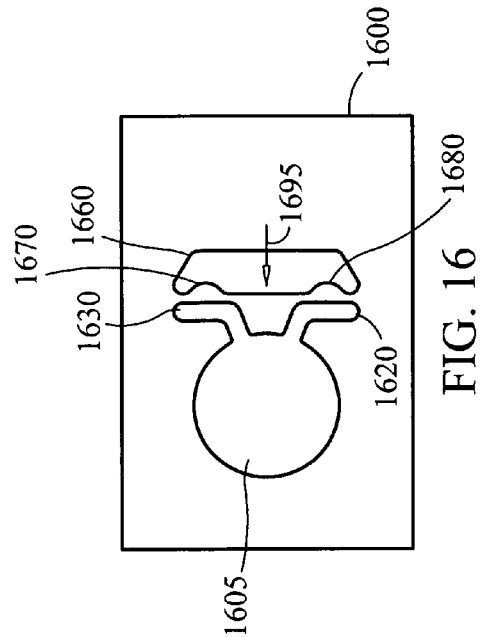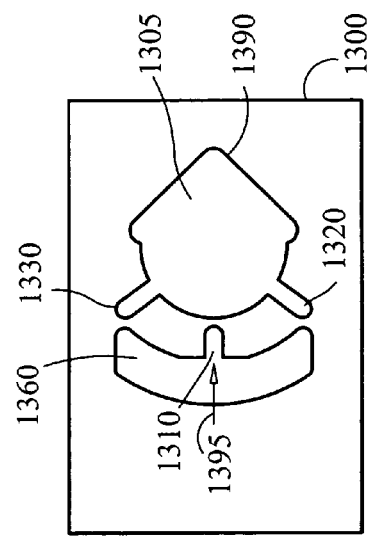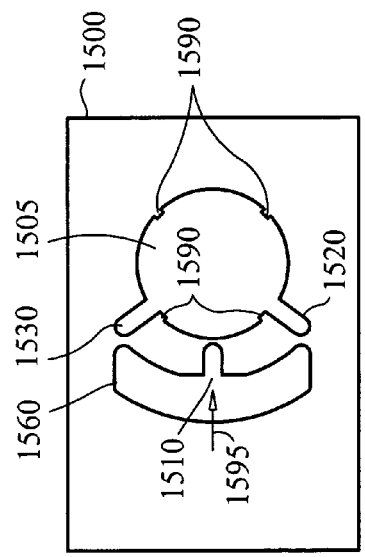

SHAFT CLAMPING MECHANISM

CROSS-REFERENCE TO RELATED APPLICATIONS

The present application claims priority from Provisional U.S. patent application Ser. No. 60/755,805, filed Jan. 3, 2006, and incorporated herein by reference in its entirety.

FIELD OF THE INVENTION

The present invention relates to an apparatus and method of making same, for clamping a cylindrical shaft so that it will not rotate in a housing. This technology may also be used to clamp shafts of various cross sectional shapes to keep them from moving axially.

BACKGROUND OF THE INVENTION

A number of clamping devices for shafts are known in the art. Burnham, U.S. Pat. No. 4,142,811, incorporated herein by reference, discloses a one-piece locking and releasing hub, which has a thrust-multiplying screw to expand or close slots during removal of assembly. See FIGS. 1, 2, and 3. Burnham discloses a collar with two slits, creating two pivot points. Great force must be applied to compress this collar. The Burnham apparatus may not be applicable to mechanisms in which the clamping force is low or moderate. Junkes, U.S. Pat. No. 5,044,816, incorporated herein by reference, discloses a pipe clip with shells in clip body, which has parallel recesses in pipe retention space sidewalls. Vanzee, U.S. Pat. No. 5,062,734, incorporated herein by reference, discloses a shaft-coupling device having a groove extending only partially into outer wall for allowing coupler to flex. See FIG. 1, details 50 and 90.

Garnett, U.S. Pat. No. 5,042,826, incorporated herein by reference, discloses a machine collet for mounting and centering tools, which has a single piece body formed with an integral resilient flexure having lands for gripping a tool shank. Garnett discloses a "flexure member" instead of three or four discrete hinge points. However, in Garnett, the flexure members create an opening that is smaller than the cylindrical object to be clamped. Therefore the displacement of the thick flexure member causes the clamping, and an external force, the action of a screw, releases the pressure. Entrup, U.S. Pat. No. 5,318,375, incorporated herein by reference, discloses an apparatus for coupling a sleeve to power take-off shaft, which consists of multiple splined hole and shaft, with two holes and locking surface. See FIGS. 5, 6, and 7. Zettl, U.S. Pat. No. 5,158,407, incorporated herein by reference, discloses a coupling for a modular tool system, which has a clamping ring of special cross section to apply an axial clamping force.

Awtar, Published U.S. patent application No. 2004/0037626A1, incorporated herein by reference, discloses a torque coupling for rotating shafts, which has a compliant support structure joined to a coupling portion, and another coupling portion joined to a structure and movable relative to former portion with pre-set degrees of freedom. Awtar discloses that cuts are made in a disk-like object to enhance flexibility, but the object is never cut through. These cuts are not used for the purpose of clamping a shaft, and their geometry does not lend them to that application. They are used in a three-dimensional way, to accommodate for shaft misalignment. Heldmann, U.S. Pat. No. 4,116,572, incorporated herein by reference, discloses a collar type shaft clamping device, which has a radial slot through a collar with a recess and coaxial aligned tapped opening on opposite sides of slot. See FIG. 1, detail 20. Neugart, U.S. Pat. No. 6,413,006, incorporated herein by reference, discloses a connection between slotted hollow shaft/sleeve and a shaft fitted into it has one or more slots, with at least one slot closed at both ends. See FIGS. 1 and 8, detail 7a. Nilsson, U.S. Pat. No. 4,565,464, incorporated herein by reference, discloses a clamping shaft-hub joint, which comprises two sets of radially and axially extending slots, closed by screws to tighten a joint.

Ruland, U.S. Pat. No. 4,428,697, incorporated herein by reference, discloses a coupling or collar for clamping to rotatable shaft, which comprises a C-shaped member having ends pulled together by screw, with a balancing hole at an intermediate portion. See FIGS. 1 and 3, details C and Ca, respectively. Nell, U.S. Pat. No. 5,857,800, incorporated herein by reference, discloses an annular shaft flange for various industries such as automotive, which has a C-shaped, symmetrical washer, which, when open, passes over a shaft and then closes together when located, before having its ends spot-welded and secured in position. See FIGS. 1, 2, 3, and 7. Nishikawa, U.S. Pat. No. 5,851,084, incorporated herein by reference, discloses an inner elastic split spacer for mounting a rotor, which comprises a twin flange arc-shaped major elastic segment to be slipped onto a shaft and another matching segment that is bolted to a major segment. Schott, U.S. Pat. No. 3,868,193, incorporated herein by reference, discloses a cylindrical shaft clamping collar formed singly or in halves with side flats to allow distortion onto a shaft surface. Ruland, U.S. Pat. No. 5,096,327, incorporated herein by reference, discloses a clamp collar assembly, which includes a screw for controlling relative distance between opposed ends of the collar to change relative diameters.

Schlanger, U.S. Pat. No. 5,810,503, incorporated herein by reference, discloses a clamping device, which includes a moving unit, which moves a clamping element along longitudinal axis of shaft from unlocking engagement to locking engagement with a shaft to clamp it between a clamping element and base. See FIGS. 2 to 5. Firth, U.S. Pat. No. 3,738,691, incorporated herein by reference, discloses a bushing comprising part of a shaft-mountable unit, which is fitted within a hub having a tapered bore. The bushing includes a shank having a flange at one end thereof. A longitudinal slot is formed within the shank and extends from adjacent the flange to the opposite end of the shank. A transverse, part-circumferential slot is formed in the shank adjacent the flange in communication with the longitudinal slot.

Eiland, U.S. Pat. No. 4,217,061, incorporated herein by reference, discloses an annular ring shaft coupling which has a circumferential slot defining spring arms, which can be clamped to shafts. Phillips, Jr., U.S. Pat. No. 3,466,922, incorporated herein by reference, discloses a die assembly. DaCunha, U.S. Pat. No. 6,840,701, incorporated herein by reference, discloses a clamping device for securing a timing pulley to drive shaft, which has a hub whose outer peripheral portion is secured to timing pulley, and whose inner bore receives drive shaft. Zugel, U.S. Pat. No. 3,917,424, incorporated herein by reference, discloses a shaft coupling clamping device, which has opposed members with arcuate inner surfaces and relatively moved by threaded studs. Previte, U.S. Pat. No. 4,207,668, incorporated herein by reference, discloses a gyroscope flexure suspension assembly, which uses radially disposed single axis flexure joints to hold separate cylindrical units together.

Crispell, U.S. Pat. No. 3,876,318, incorporated herein by reference, discloses a pre-stressed steel shaft collar, which is split with axially aligned threaded holes. Howard, U.S. Pat. No. 3,473,202, incorporated herein by reference, discloses a pre-stressed shaft-engaging collar. Tuns, U.S. Pat. No. 5,306,096, incorporated herein by reference, discloses an adjustable body-coupling to a cylindrical shaft, which has a transverse slot in the body forming flanges clamped by screws against shaft.

SUMMARY OF THE INVENTION

One primary application of this device is to clamp a cylindrical shaft such that it will not rotate in a housing. This technology may also be used to clamp shafts of various cross sectional shapes to keep them from moving axially. The basic idea is to remove, using ordinary machine tools or the like, portions of the housing that surrounds the shaft leaving thin areas that act as hinges. The housing may not be cut all the way through so that the hinged or moving portion of the housing that exerts the clamping force is contiguous with the rest of the housing. In most of these examples, a series of three or four hinges lie upon a straight line. Applying force in a plane that is perpendicular to the axis of the shaft, toward the shaft, in the middle of this hinged portion allows that part of the housing to move very slightly. It is assumed that the housing and shaft will be a close fit so that only a slight amount of movement on the moving part of the housing will be required to clamp the shaft. In order for this mechanism to work, the housing material has to flex slightly at the "hinges". The stationary portions of the housing must also deflect very slightly.

One unique aspect of this approach is that the housing that surrounds the shaft is integral with the clamping or movable portion of the housing. Therefore, there is no circumferential or axial movement of the clamping portion with regard to the rest of the housing. (The only movement is radial.) In an instrument or mechanism that requires precise positioning of a shaft or housing, this device can be used to fix the position of a shaft relative to the housing without substantially perturbing the shaft. In the standard or simplest version of this mechanism, the forces on the shaft are symmetric thus assuring that the aggregate movement of the clamping elements is truly radial. In most other types of clamps, for example, an ordinary one-piece clamp-on (pinch type) shaft collars, there is substantial circumferential motion, of the collar relative to the shaft as it is tightened.

The present invention is basically two-dimensional in nature. Some of the patents previously cited required the use of a third dimension and are therefore intrinsically different from the present invention. Another feature of the present invention is that the housing or collar is never completely cut through. Many of the previously cited Patents include through slots like a conventional pinch-type shaft collar. Of the previously cited Patents, the one most similar to the present invention, U.S. Pat. No. 5,042,826 is quite distinct from the present invention in that discrete hinge points are not developed.

The present invention may enjoy wide application because it involves a simple process of arresting the movement of a shaft relative to a housing. The most common application of this device is in the precise clamping of a shaft in a housing. Examples include surveying instruments, tripod heads, and other optical devices. The invention is being employed at this time in the panning base of a tripod head for telephoto lenses. In this application, the conventional methods of clamping the shaft are typically one of two types, both of which were rejected in the process of designing the tripod head.

The first type is a split housing that acts very much like a pinch-type shaft collar (also known as a one-piece clamp-on shaft collar). The second type (the set screw mechanism) may be a simple housing with a threaded hole oriented radially toward the center of the shaft. A threaded rod acting essentially as a setscrew in a set collar enters the threaded hole, and when tightened, pushes against the shaft.

The present invention has significant advantages over a split housing. In a split housing, the threaded shaft that activates the clamping action is not radial, but is more or less tangential to the shaft. It is often advantageous, for example when using a cast housing that is symmetrical about parting line, to have the clamping threaded rod radially aligned with the shaft. This alignment is obtainable with the present invention, but not with the Prior Art pinch clamp geometry.

Pinch clamps also require much greater force to activate. Furthermore, if the area opposite the slot in a pinch clamp is reduced enough to make clamping easier, the strength of the mechanism is greatly reduced. A primary disadvantage of a pinch clamp mechanism is that activating the clamp results in circumferential movement of the clamping element, which causes the shaft to rotate. This rotation, however slight, is noticeable, looking through a telephoto lens mounted to a camera.

A pinch clamp can be adjusted for initial fit by the addition of a second threaded fastener, for example. This approach, however, takes a lot of room. The great variety of configurations of the present invention allows for the inclusion of features that provide adjustment without increasing the size of the mechanism significantly.

A pinch clamp has, by definition, a slot that extends from the shaft to the outside of the housing. This slot can admit dust and other contamination. The present invention has no slot that extends all the way from the shaft to the outside of the housing, and therefore contaminants are prevented from reaching the shaft.

Pinch clamps are easy to manufacture, but so is the present invention. In the case of nanotechnology the present invention is very easy to manufacture because it can be an entirely two-dimensional process, which lends itself well to semiconductor manufacturing techniques and the like.

The invention also has significant advantages compared to the Prior Art setscrew mechanism. There are several problems with the setscrew mechanism. There may be some interaction between the tip of the setscrew and the shaft that causes the shaft to rotate. The screw is inherently somewhat loose in its threaded bore and this looseness contributes to sloppy and variable engagement of the shaft. The end of the screw may dent the shaft. A slug that fits in a relatively tight bore can be interposed between the screw and the shaft, but any play between the slug and its bore shows up in the tightening process. If the play has been eliminated or almost eliminated, a mechanism will be needed to retract the slug when the screw is withdrawn.

The present invention eliminates all of the above problems. The clamping portion of the housing does not rotate, as the end of the screw does. Because it is contiguous with the rest of the housing, it does not move circumferentially or axially, thus eliminating all play in the clamping mechanism. The clamping area is typically quite large, thus reducing the likelihood of deformation of the shaft. The clamping portion needs no return mechanism; it is returned to its original position by the springiness of the material. The mechanism proposed herein is easier to manufacture than a setscrew mechanism that is designed to eliminate as much play as possible.

There is an additional problem with the setscrew mechanism that may exist even if the clamping slug were a perfect fit in its bore. There has to be some clearance between the shaft and the housing bore. As the clamping slug starts to push on the shaft, the shaft contacts the housing bore at some arbitrary spot, not generally exactly opposite from the slug. As the slug is tightened onto the shaft, the shaft tends to roll along the inside of the housing bore slightly. This slight rolling, in a tripod application, is unfortunately nontrivial and results in movement of the shaft, and therefore movement of the lens.

The present invention also addresses this issue. In the preferred embodiment as exemplified in FIGS. 1, 3, 4, and 5 (as well as other Figures) the shaft is clamped by two relatively broad surfaces that are symmetric with regard to a radial line (in FIG. 1, a line that may include the force arrow 195). These two broad symmetric surfaces tend to capture and guide the shaft so that very little rotation occurs as it touches and is clamped against the opposite side of the housing bore. Decreasing the clearance between the housing bore and the shaft can reduce the movement described in the above paragraph. The present invention allows for adjustment of the location of the clamping elements through various means presented elsewhere. In addition, the clamping elements can be carefully pushed in the direction of the shaft (with the shaft absent) until there has been a slight plastic deformation of hinge areas resulting in a tighter fit between shaft and housing.

The type of hinges used in the present invention are known as "live" hinges, in that the hinge element is formed from the surrounding materials, and are very common in injection molded articles. For example, such live hinges are commonly used in glove box doors and other automotive applications. While there have been a number of applications for such live hinges, most of them deal with plastic. Live hinges have also been used in semiconductor technology, for example, in manufacturing pendular micro-accelerometers.

A hinged body may be described as follows. Suppose one has a two-dimensional object such as a rectangle. The rectangle is cut into by various slots or gashes, none of which severs one part of the rectangle from the rest. Any time two of these slots or gashes come within a certain specified small distance Delta from one another, a hinge in the form of a necked-down area may be formed. If the width of the necked-down area is more or less the same as Delta, the necked-down portion can be considered a hinge. If the width of the necked down portion is substantially greater than Delta then the necked-down portion may be considered a strap or flexible member. If the area between two hinges is everywhere substantially thicker than the hinge then it is a hinged body.

In the preferred embodiment, live hinges may be formed by machining or otherwise forming slots into a collar or housing. These slots may be formed symmetrically with respect to the housing. A second opening may be formed in the housing to create hinge areas. The second opening may be symmetric around a bisector of the first opening. The shaft may be better constrained when cutouts are provided opposite the clamping portion of the housing. If there is no cut out the shaft can roll a bit in the first opening, but a greater area of support is provided. The cutouts in the first opening may negate any tendency for the shaft to roll, but provides less supportive area.

In a typical way of activating one of these mechanisms wherein the body is a rectangle (not a simple collar), may be to pierce the outside of the rectangle with a threaded hole, and provide a small counterbore as a seat for the end of the pushrod. A hole that goes through the outer housing and terminates in a shallow counter bore on one or more of the hinging elements, which may be activated by an outside force. In order to activate this mechanism, the force should be on the movable portion of the housing.

BRIEF DESCRIPTION OF THE DRAWINGS

FIG. 1 is a top view of a first embodiment of the present invention with a clamping collar similar in proportion to Prior Art shaft collars.

FIG. 2 is a perspective view of a first embodiment of the present invention with a clamping collar similar in proportion to Prior Art shaft collars.

FIG. 3 is a top view of a second embodiment of the present invention, where five slots are used to reduce the clamping area, and the stationary or constraining area of the housing is correspondingly increased.

FIG. 4 is a top view of a third embodiment of the present invention, where the housing is a rectangle.

FIG. 13 is a top view of a variation on the ninth embodiment of the present invention where a portion of the stationary part of the housing is relieved to better constrain the shaft, especially if the size of the shaft, in a production situation varies within a tolerance range.

FIG. 14 is a top view of another variation on the ninth embodiment of the present invention where a portion of the stationary part of the housing is relieved to better constrain the shaft, especially if the size of the shaft, in a production situation varies within a tolerance range.

FIG. 15 is a top view of yet another variation on the ninth embodiment of the present invention where raised areas contact the shaft. In this example the raised areas may typically be formed by removing portions of both the stationary and moving parts of the housing.

FIG. 16 is a top view of a tenth embodiment of the present invention, where, if it is desirable to have only one portion of the housing pressing against the shaft, a four-hinge configuration may be employed.

DETAILED DESCRIPTION OF THE INVENTION

Figure 5:
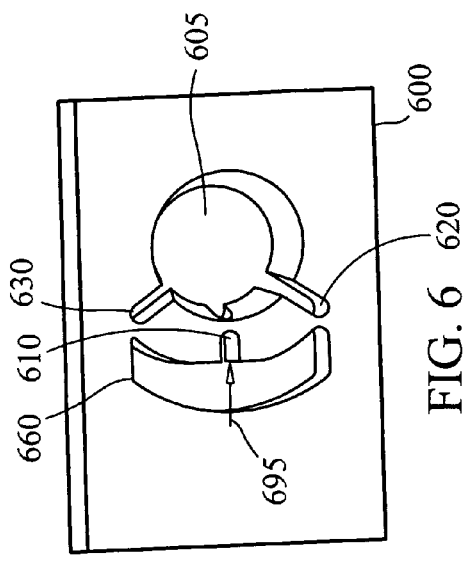
FIG. 5 is a top view of a fourth embodiment of the present invention, where the housing is a rectangle.

FIG. 1 is a top view of a first embodiment of the present invention with a clamping collar similar in proportion to Prior Art shaft collars. FIG. 2 is a perspective view of the first embodiment of the present invention with a clamping collar similar in proportion to Prior Art shaft collars. The embodiment of FIGS. 1 and 2 is roughly circular in shape, and thus may be compatible in applications where Prior Art shaft collars have been used.

Referring to FIGS. 1 and 2, collar 100 includes internal slots 120 and 130 formed within opening 105 of collar 100, and external slot 110 formed on the outer surface of collar 100, leaving three thinned areas in collar 100 that act as hinges. Applying pressure to the collar in the direction of external slot 110, as indicated by arrow 195, collapses the hinged portion of collar 100 toward the shaft and clamps the shaft thus arresting motion, both rotational and axial (around the shaft and along the shaft). In FIG. 2, slot 110 has been provided with a counter-bore to accept a pushrod or other means to apply the force.

FIG. 3 is a top view of a second embodiment of the present invention, where five slots 310 320, 330, 340, and 350 are used to reduce the clamping area, and consequently increase the stationary or constraining area of the housing. Referring to FIG. 3, collar 300 includes internal slots 320 and 330 formed within opening 305 of collar 300, and external slot 310 formed on the outer surface of collar 300, leaving three thinned areas in collar 300 that act as hinges. In this embodiment, additional external slots 340 and 350 are formed on an external surface of collar 300 to help form the hinge areas. Applying pressure to the collar at external slot 310, as indicated by arrow 395, collapses the hinged portion of collar 300 toward the shaft and clamps the shaft thus arresting motion, both rotational and axial (around the shaft and along the shaft). Slot 310 may be provided with a counter-bore to accept a pushrod or other means to apply the force, as in FIG. 2. Thus, in the second embodiment of FIG. 3, five slots are used to achieve the same end as the first embodiment of FIGS. 1 and 2. Using this second technique, the clamping area is reduced, and the stationary or constraining area of the housing is correspondingly increased.

Compared to some other methods of clamping a shaft, the clamping area can be quite large, and, presuming the diameters of the shaft and the housing are close in size, the clamping area conforms to the shape of the shaft closely, thus reducing the likelihood of deformation of the shaft in clamping. The basic concept of the present invention can be widely adapted. The shape of the cut portion can be a narrow slot as illustrated in FIGS. 1-3, it may also be provided as a thin saw kerf, or as a much wider slot. The contours can be irregular, curved or linear, within the spirit and scope of the present invention, so long as they leave appropriately placed hinge areas in the original material.

The housing can be a conventional collar as illustrated above or a housing of any shape. In the FIGS. 4 and 5, the housing is a rectangle. Also note that the slots may be of varying length, as illustrated in FIGS. 4 and 5.

FIG. 4 is a top view of a third embodiment of the present invention, where the housing is a rectangle. Referring to FIG. 4, collar 400 includes internal slots 420 and 430 formed within opening 405 of collar 400, and external slot 410, leaving three thinned areas in collar 400 that act as hinges. Collar 400 is provided with an opening 460, in this embodiment having a substantially arc shape and provided with a slot 410. Applying pressure to the collar in the direction of external slot 410, as indicated by arrow 495, collapses the hinged portion of collar 400 toward the shaft and clamps the shaft thus arresting motion, both rotational and axial (around the shaft and along the shaft). Alternately, force may be applied (or may also be applied) as indicated by arrows 412 and 414 to collapse the hinged portion of collar 400 toward the shaft and clamp the shaft thus arresting motion, both rotational and axial (around the shaft and along the shaft). As in FIG. 2, slot 410 may be provided with a counterbore (a flat-bottomed hole) to accept a pushrod or other means to apply the force. Two alternate locations of clamping force, exemplified by arrows 412 and 414, are shown in the example. Similar alternate force locations, can be used on other, similar, configurations. Although clamping force is typically applied radially toward the center of the mechanism, as force 195 in FIG. 1, any force applied toward the shaft on a hinged portion of the mechanism will effect clamping.

FIG. 5 is a top view of a fourth embodiment of the present invention, where the housing is a rectangle. Referring to FIG. 5, collar 500 includes internal slots 520 and 530 formed within opening 505 of collar 500, and external slot 510, leaving three thinned areas in collar 500 that act as hinges. Collar 500 is provided with an opening 560, in this embodiment having a substantially arc shape and provided with a slot 510. Applying pressure to the collar in the direction of external slot 510, as indicated by arrow 595, collapses the hinged portion of collar 500 toward the shaft and clamps the shaft thus arresting motion, both rotational and axial (around the shaft and along the shaft). As in the prior Figures, counterbore(s) may be provided to accept a pushrod or other means to apply the force.

Figure 6:
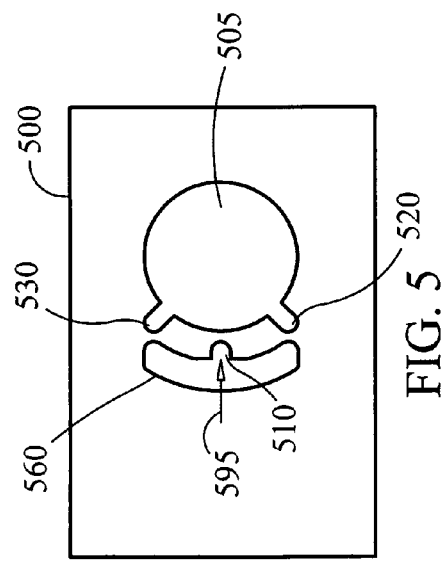
FIG. 6 is perspective view of a fifth embodiment where the mechanism may be applied to a tapered shaft.

FIG. 6 is perspective view of a fifth embodiment where the mechanism may be applied to a tapered shaft. The embodiment of FIG. 6, illustrated here as rectangular (although other shapes may be used) is similar to the previous embodiments of FIGS. 1-3 and other embodiments of the present application. The embodiment of FIG. 6 is provided a tapered opening for accepting a tapered shaft (not illustrated). The taper used may be selected to mate with a particular shaft taper angle. Referring to FIG. 6, housing 600 includes internal slots 620 and 630 formed within opening 605 of collar 600, and external slot 610, leaving three thinned areas in collar 600 that act as hinges. Collar 600 is provided with an opening 660, in this embodiment having a substantially arc shape and provided with a slot 610. Applying pressure to the collar in the direction of external slot 610, as indicated by arrow 695, collapses the hinged portion of collar 600 toward the shaft and clamps the shaft thus arresting motion, both rotational and axial (around the shaft and along the shaft). As in the prior Figures, counterbore(s) may be provided to accept a pushrod or other means to apply the force.

In FIG. 6, the housing is designed to fit a tapered shaft. When the clamp is tightened, the housing will tend to slide axially toward the small end of the shaft. This mechanism can be used to seat the housing against a shoulder on the shaft. In this example there is a sloped, in this case conical, hole in the housing, as opposed to the standard situation in which there is no slope to the surface as in a cylindrical hole in the housing.

Figure 7:
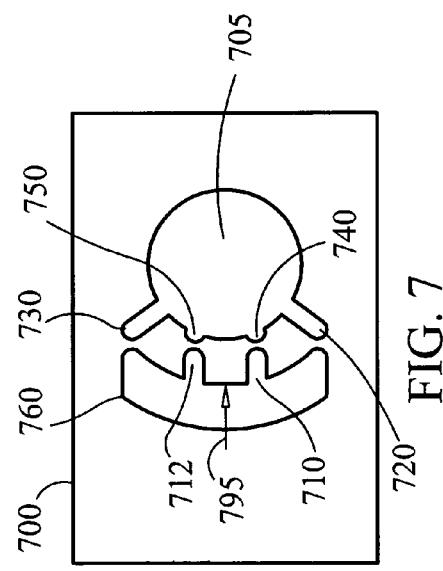
FIG. 7 is a top view of a sixth embodiment of the present invention, where the mechanism uses four slots to create three hinged bodies.

FIG. 7 is a top view of a sixth embodiment of the present invention, where the mechanism uses four slots to create three hinged bodies. Referring to FIG. 7, housing 700 includes internal slots 720 and 730, and shorter internal slots 740 and 750, formed within opening 705 of collar 700, and external slots 710 and 712. The external slots cooperate with the shorter internal slots to create two thinned areas in collar 700 that act as hinges. Collar 700 is provided with an opening 760, in this embodiment having a substantially arc shape and provided with slots 710 and 712. The ends of opening 760 and slots 720 and 730 cooperate to form two additional thinned areas that act as hinges, creating a total of four hinges. Applying pressure to the collar in the direction of external slots 710 and 712, as indicated by arrows 795, collapses the central hinged portion of collar 700 toward the shaft and clamps the shaft thus arresting motion, both rotational and axial (around the shaft and along the shaft). As in the prior Figures, counterbore(s) may be provided to accept a pushrod or other means to apply the force. The embodiment of FIG. 7 may be expanded within the spirit and scope of the present invention, to include more than two external slots 710, 712 (and optional corresponding internal slots), to provide additional hinge areas.

In most of the examples discussed to this point, the force has been applied to an area that is split by a slot. If it is desirable to apply force on a solid area, force can be applied offset from the slot in either or both of the two alternate locations illustrated in FIG. 4. Alternately, a mechanism that uses four slots to create three hinged bodies can be used as in FIG. 7. Although this method may have advantages in some applications, the segments are not fully constrained. Additional constraint can be provided by the pushing mechanism, for example if a pusher rod mates with a cylindrical recess in the segment being pushed.

Figure 8:
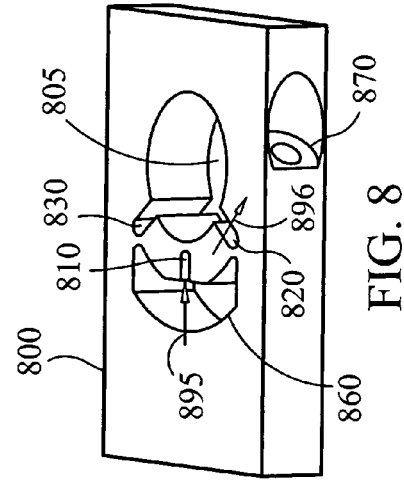
FIG. 8 is a perspective view of a seventh embodiment of the present invention, where one or two screws, either in tension or compression can be applied to this mechanism to apply clamping force or to adjust the gap between the clamping portion of the housing and the stationary portion, or between two clamping portions.
Figure 9:
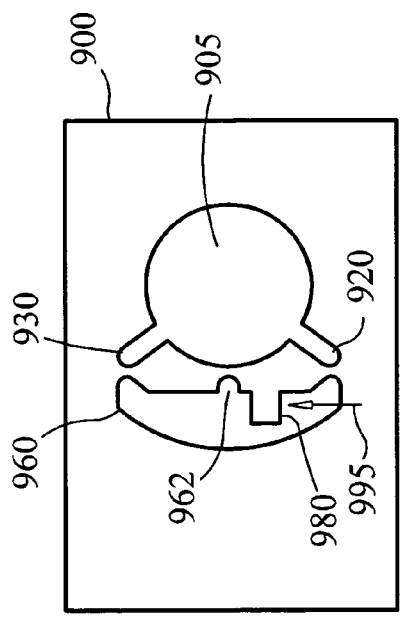
FIG. 9 is a top view of a variation on the seventh embodiment of the present invention, where one or two screws, either in tension or compression can be applied to this mechanism to apply clamping force or to adjust the gap between the clamping portion of the housing and the stationary portion, or between two clamping sections.

FIG. 8 is a perspective view of a seventh embodiment of the present invention. FIG. 9 is a top view of a variation on the seventh embodiment of the present invention. In FIGS. 8 and 9, we see that one or two screws, either in tension or compression can be applied to this mechanism to apply clamping force or to adjust the gap between the clamping portion of the housing and the stationary portion, or between two clamping sections. Such mechanisms can therefore provide clamping force, provide "pretension", or adjust the clearance between the shaft and the clamping housing.

Referring to FIG. 8, housing 800 includes internal slots 820 and 830 formed within opening 805 of collar 800, and external slot 810, leaving three thinned areas in housing 800 that act as hinges. Housing 800 is provided with an opening 860, in this embodiment having a substantially arc shape and provided with a slot 810. Applying pressure to the collar in the direction of external slot 810, as indicated by arrow 895, collapses the hinged portion of collar 800 toward the shaft and clamps the shaft thus arresting motion, both rotational and axial (around the shaft and along the shaft). In this embodiment, pressure may alternately (or also) be applied to collar 800 in the direction arrow 896, to provided an initial tension, adjust the gap between collar 800 and the shaft, and/or to collapse the hinged portion of collar 800 toward the shaft and clamp the shaft thus arresting motion, both rotational and axial (around the shaft and along the shaft). In this embodiment, collar 800 may be provided with a counterbore 870 to accept a pushrod, threaded member, or other means to apply force in the direction of arrow 896. A similar counterbore may be provided to clamp the hinge formed by slot 830.

Referring to FIG. 9, housing 900 includes internal slots 920 and 930 formed within opening 905 of housing 900, and external notch 962, leaving three thinned areas in housing 900 that act as hinges. Housing 900 is provided with an opening 960, in this embodiment having a substantially arc shape and provided with a notch 962, and boss 980. Applying pressure to boss 980 in the direction indicated by arrow 995, may be used to provide an initial tension, to adjust the gap between collar 900 and a shaft, and/or may be used to provide a clamping force by collapsing the hinged portion of housing 900 toward the shaft and clamp the shaft thus arresting motion, both rotational and axial (around the shaft and along the shaft). As in the prior Figures, counterbore(s), and/or threaded holes may be provided to accept a pushrod or other means to apply the force.

Figure 10:
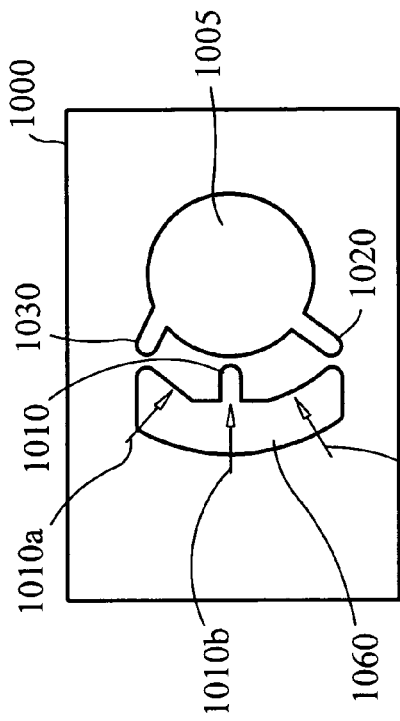
FIG. 10 is a top view of an eighth embodiment of the present invention where asymmetric geometry is employed.
Figure 11:
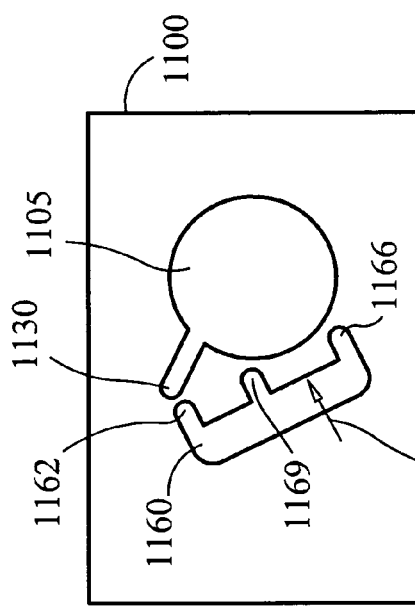
FIG. 11 is a top view of a variation on the eighth embodiment of the present invention where asymmetric geometry is employed.

The examples given thus far have been symmetric, for good reason. Asymmetric geometry as illustrated in FIGS. 10 and 11 can, however, be used as indicated in the following examples. FIG. 10 is a top view of an eighth embodiment of the present invention where asymmetric geometry is employed. FIG. 11 is a top view of a variation on the eighth embodiment of the present invention where asymmetric geometry is employed.

Referring to FIG. 10, collar 1000 includes asymmetrical internal slots 1020 and 1030 formed within opening 1005 of collar 1000, and external slot 1010, leaving three thinned areas in collar 1000 that act as hinges. Collar 1000 is provided with an opening 1060, in this embodiment having a substantially arc shape and provided with a slot 1010. Force may typically be applied along arrow 1010*b*, but, as is the case for most of these embodiments, force may alternately be applied at other locations and in other directions. Arrows 1010*a* and 1010*c* show alternate force locations and directions. Applying pressure to the collar in one or more of the directions indicated by arrows 1010*a*, 1010*b*, and 1010*c* may collapse the hinged portion of collar 1000 toward the shaft and clamp the shaft thus arresting motion, both rotational and axial (around the shaft and along the shaft). As in the prior Figures, counterbore(s) may be provided to accept a pushrod or other means to apply the force.

Referring to FIG. 11, collar 1100 includes a different arrangement with a single offset internal slot 1130 formed within opening 1105 of collar 1100, and external slots 1166, 1162, and 1169, leaving three thinned areas in collar 1100 that act as hinges. Collar 1100 is provided with an opening 1160, in this embodiment having a substantially linear shape. Applying pressure to the collar in the direction indicated by arrow 1195, collapses the hinged portions of collar 1100 toward the shaft and clamps the shaft thus arresting motion, both rotational and axial (around the shaft and along the shaft). As in the prior Figures, counterbore(s) may be provided to accept a pushrod or other means to apply the force.

Figure 12:
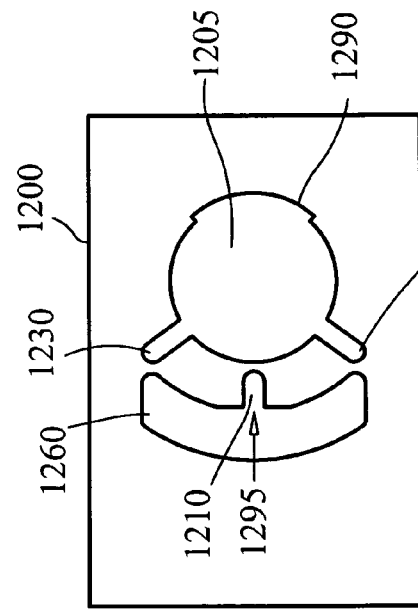
FIG. 12 is a top view of a ninth embodiment of the present invention where a portion of the stationary part of the housing is relieved to better constrain the shaft, especially if the size of the shaft, in a production situation varies within a tolerance range.

FIG. 12 is a top view of a ninth embodiment of the present invention where a portion 1290 of the stationary part of the collar or housing 1200 is relieved to better constrain the shaft, especially if the size of the shaft, in a production situation varies within a tolerance range. FIG. 13 is a top view of a variation on the ninth embodiment of the present invention where a portion 1390 of the stationary part of the housing

1300 is relieved, essentially forming a V-block to better constrain the shaft, especially if the size of the shaft, in a production situation varies within a tolerance range. FIG. 14 is a top view of another variation on the ninth embodiment of the present invention where a portion of the stationary part of the housing is relieved to better constrain the shaft, especially if the size of the shaft, in a production situation varies within a tolerance range. FIG. 15 is a top view of yet another variation on the ninth embodiment of the present invention where raised areas contact the shaft. Removing material from both the stationary and the moving portions of the housing may typically form these raised areas.

It may be desirable to relieve portions of the stationary and/or the moving part of the housing to better constrain the shaft, especially if the size of the shaft, in a production situation varies within a tolerance range. FIGS. 12 through 15 illustrate these concepts.

Referring to FIG. 12, collar 1200 includes internal slots 1220 and 1230 formed within opening 1205 of collar 1200, and external slot 1210, leaving three thinned areas in collar 1200 that act as hinges. Collar 1200 is provided with an opening 1260, in this embodiment having a substantially arc shape and provided with a slot 1210. Applying pressure to the collar in the direction of external slot 1210, as indicated by arrow 1295, collapses the hinged portion of collar 1200 toward the shaft and clamps the shaft thus arresting motion, both rotational and axial (around the shaft and along the shaft). In the embodiment of FIG. 12, portion 1290 has been removed from the inner surface of opening 1205 to better constrain the shaft, especially if the size of the shaft, in a production situation varies within a tolerance range. As in the prior Figures, counterbore(s) may be provided to accept a pushrod or other means to apply the force.

Referring to FIG. 13, collar 1300 includes internal slots 1320 and 1330 formed within opening 1305 of collar 1300, and external slot 1310, leaving three thinned areas in collar 1300 that act as hinges. Collar 1300 is provided with an opening 1360, in this embodiment having a substantially arc-shape and provided with a slot 1310. Applying pressure to the collar in the direction of external slot 1310, as indicated by arrow 1395, collapses the hinged portion of collar 1300 toward the shaft and clamps the shaft thus arresting motion, both rotational and axial (around the shaft and along the shaft). In the embodiment of FIG. 13, portion 1390 has been removed from the inner surface of opening 1305 forming a V-block to better constrain the shaft, especially if the size of the shaft, in a production situation varies within a tolerance range. As in the prior Figures, counterbore(s) may be provided to accept a pushrod or other means to apply the force.

Referring to FIG. 14, collar 1400 includes internal slots 1420 and 1430 formed within opening 1405 of collar 1400, and external slot 1410, leaving three thinned areas in collar 1400 that act as hinges. Collar 1400 is provided with an opening 1460, in this embodiment having a substantially arc shape and provided with a slot 1410. Applying pressure to the collar in the direction of external slot 1410, as indicated by arrow 1495, collapses the hinged portion of collar 1400 toward the shaft and clamps the shaft thus arresting motion, both rotational and axial (around the shaft and along the shaft). In the embodiment of FIG. 14, portion 1490 has been removed in a double-arc shape, from the inner surface of opening 1405 to better constrain the shaft, especially if the size of the shaft, in a production situation varies within a tolerance range. As in the prior Figures, counterbore(s) may be provided to accept a pushrod or other means to apply the force.

Referring to FIG. 15, collar 1500 includes internal slots 1520 and 1530 formed within opening 1505 of collar 1500, and external slot 1510, leaving three thinned areas in collar 1500 that act as hinges. Collar 1500 is provided with an opening 1560, in this embodiment having a substantially arc shape and provided with a slot 1510. Applying pressure to the collar in the direction of external slot 1510, as indicated by arrow 1595, collapses the hinged portion of collar 1500 toward the shaft and clamps the shaft thus arresting motion, both rotational and axial (around the shaft and along the shaft). In the embodiment of FIG. 15, raised portions have been provided on the inner surface of opening 1505 to better constrain the shaft, especially if the size of the shaft, in a production situation varies within a tolerance range. As in the prior Figures, counterbore(s) may be provided to accept a pushrod or other means to apply the force.

In FIG. 15, only 4 raised areas contact the shaft. By varying the locations of the raised areas and the applied force, the mechanical advantage of the mechanism can be changed. For example, in FIG. 15, mechanical advantage is increased because the lever arm of the force is longer than the lever arm of the raised contact area.

FIG. 16 is a top view of a tenth embodiment of the present invention, where, if it is desirable to have only one portion of the housing pressing against the shaft, a four-hinge configuration may be employed.

Referring to FIG. 16, collar 1600 includes bent internal slots 1620 and 1630 formed within opening 1605 of collar 1600, leaving two thinned areas in collar 1600 that act as hinges. Additional hinges are formed in the two necked down areas inboard of the two bulges 1670 and 1680. Collar 1600 is provided with an opening 1660, in this embodiment having a substantially linear shape and provided with indented portions opposite bent slots 1620 and 1630. Applying pressure in the direction indicated by arrow 1695 collapses the hinged portions of collar 1600 toward the shaft and clamps the shaft thus arresting motion, both rotational and axial (around the shaft and along the shaft). As in the prior Figures, counterbore(s) may be provided to accept a pushrod or other means to apply the force.

Figure 17:
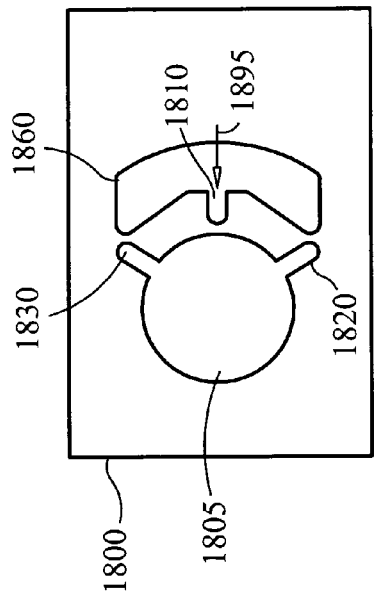
FIG. 17 is a top view of an eleventh embodiment of the present invention, where the hinge points on each side have been merged into a long flexible strap.

FIG. 17 is a top view of an eleventh embodiment of the present invention. In this example the hinge points on each side have been merged into a long flexible strap and there are no longer discrete hinge areas. This geometry may make the "hinges" more flexible and less susceptible to fatigue damage, but they will make the mechanism less rigid. (See U.S. Pat. No. 5,042,826, which employs a similar geometry, but in which the force is applied by the spring action of a much thicker "flexural member").

Referring to FIG. 17, collar 1700 includes bent internal slots 1720 and 1730 formed within opening 1705 of collar 1700, and external opening 1770, leaving two thinned areas in collar 1700 that act as hinges. Opening 1770, in this embodiment having a substantially linear shape. Applying pressure to the collar in the direction indicated by arrow 1795 collapses the hinged portion of collar 1700 toward the shaft and clamps the shaft thus arresting motion, both rotational and axial (around the shaft and along the shaft). As in the prior Figures, counterbore(s) may be provided to accept a pushrod or other means to apply the force.

Figure 18:
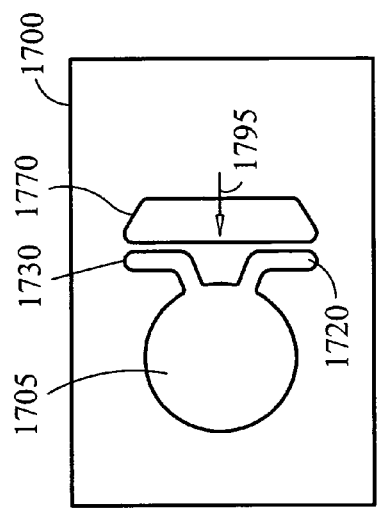
FIG. 18 is a top view of a twelfth embodiment of the present invention, where the hinges are not perfectly aligned, and the outer two hinges are shifted toward the shaft.

FIG. 18 is a top view of a twelfth embodiment of the present invention, where the hinge points have been slightly misaligned. In the examples illustrated to this point, the hinge points have been aligned. There may be occasions when it is advantageous to have them slightly misaligned. If the hinges are aligned, relatively little force is required to produce the small amount of movement typically needed to clamp a shaft.

If, for example, in a three-hinge mechanism, the outer two hinges are moved toward the shaft, the initial movement of the clamping portion will cause the rest of the housing to open up, and a greater force will be required to effect clamping. Once sufficient displacement is obtained to align the hinges, the force required to move the clamping portion will decrease dramatically. This geometry is depicted in FIG. 18.

Referring to FIG. 18, collar 1800 includes internal slots 1820 and 1830 formed within opening 1805 of collar 1800, and external slot 1810, leaving three thinned areas in collar 1800 that act as hinges. Collar 1800 is provided with an opening 1860, in this embodiment having a substantially arc shape and provided with a slot 1810. Applying pressure to the collar in the direction of external slot 1810, as indicated by arrow 1895, collapses the hinged portion of collar 1800 toward the shaft and clamps the shaft thus arresting motion, both rotational and axial (around the shaft and along the shaft). As in the prior Figures, counterbore(s) may be provided to accept a pushrod or other means to apply the force.

Figure 19:
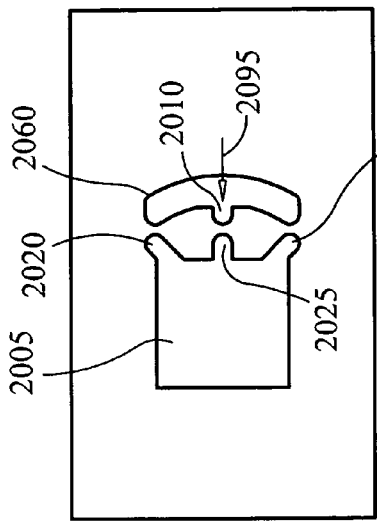
FIG. 19 is a top view of a thirteenth embodiment of the present invention, where the outer two hinges are shifted away from the shaft.

FIG. 19 is a top view of a thirteenth embodiment of the present invention, where the outer two hinges are shifted away from the shaft. When the outer two hinges are shifted away from the shaft, clamping action will cause the housing to close up immediately, and greater clamping force will be required. This geometry might be advantageous where it is desirable to clamp the shaft over a large area because the housing as well as the nominal clamping portion moves toward the shaft. (This latter approach only works if the housing is sufficiently flexible).

Referring to FIG. 19, collar 1900 includes internal slots 1920 and 1930 formed within opening 1905 of collar 1900, and external slot 1910, leaving three thinned areas in collar 1900 that act as hinges. Collar 1900 is provided with an opening 1960, in this embodiment having a substantially arc shape and provided with a slot 1910. Applying pressure to the collar in the direction of external slot 1910, as indicated by arrow 1995, collapses the hinged portion of collar 1900 toward the shaft and clamps the shaft thus arresting motion, both rotational and axial (around the shaft and along the shaft). As in the prior Figures, counterbore(s) may be provided to accept a pushrod or other means to apply the force.

Figure 20:
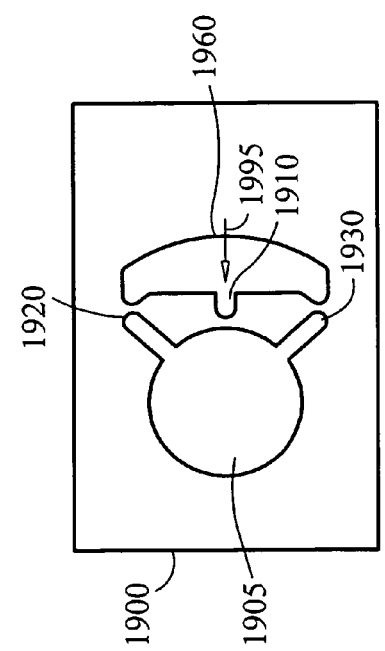
FIG. 20 is a top view of a fourteenth embodiment of the present invention, illustrating a housing suitable to clamp a square component so as to resist the axial movement of the component.

FIG. 20 is a top view of a fourteenth embodiment of the present invention, illustrating a housing suitable to clamp a square component so as to resist the axial movement of the component. As previously stated, the shape of the shaft or other object that is being clamped can vary from the typical cylindrical shaft. Note that the embodiment of FIG. 20 may be applied to other shaft shapes (rectangular, polygonal, asymmetrical, and the like).

Referring to FIG. 20, collar 2000 includes internal slots 2020, 2025, and 2030 formed within square or rectangular opening 2005 of collar 2000, and external slot 2010, leaving three thinned areas in collar 2000 that act as hinges. Collar 2000 is provided with an opening 2060, in this embodiment having a substantially arc shape and provided with a slot 2010. Applying pressure to the collar in the direction of external slot 2010, as indicated by arrow 2095, collapses the hinged portion of collar 2000 toward the shaft and clamps the shaft thus arresting motion, both rotational (only if the shaft is loose) and axial. As in the prior Figures, counterbore(s) may be provided to accept a pushrod or other means to apply the force.

Figure 21:
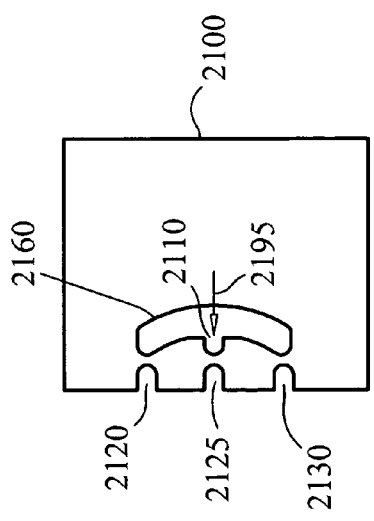
FIG. 21 is a top view of a fifteenth embodiment of the present invention where the clamping mechanism in the standard configuration is contained within a housing that is surrounded by another component.

FIG. 21 is a top view of a fifteenth embodiment of the present invention where the clamping mechanism in the standard configuration is contained within a housing that is surrounded by another component. In FIG. 21 we see a clamping mechanism that can act on a component outside of itself. If the interface between the components is sloped, clamping action can result in movement perpendicular to the plane of the paper.

Referring to FIG. 21, mechanism 2100 includes slots 2120, 2125, and 2130 formed on one side of mechanism 2100, and slot 2110, leaving three thinned areas in mechanism 2100 that act as hinges. Mechanism 2100 is provided with an opening 2160, in this embodiment having a substantially arc shape and provided with a slot 2110. Applying pressure to the collar in the direction of slot 2110, as indicated by arrow 2195, pushes the hinged portion of mechanism 2100 outward toward the surrounding component and clamps the component thus arresting motion, both rotational (if the mechanism is round) and axial (around the mechanism and along the mechanism). As in the prior Figures, counterbore(s) may be provided to accept a pushrod or other means to apply the force.

Figure 22:
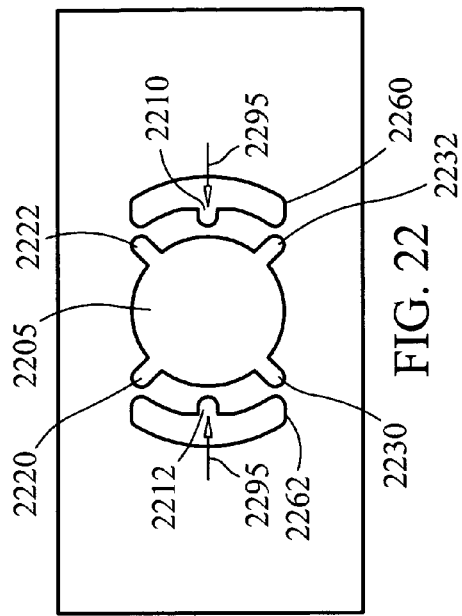
FIG. 22 is a top view of a sixteenth embodiment of the present invention, where two or more mechanisms act together.

FIG. 22 is a top view of a sixteenth embodiment of the present invention, where two or more mechanisms act together. Typically, we may expect only one clamping mechanism to be used in a given pair of components, for example, housing and shaft. There may be occasions, however, when it is useful to have two or more mechanisms acting together, as illustrated in FIG. 22.

Referring to FIG. 22, collar 2200 includes internal slots 2220, 2222, 2232, and 2230 formed within opening 2205 of collar 2200, and external slots 2210 and 2212, leaving six thinned areas in collar 2200, three on each side, that act as hinges. Collar 2200 is provided with openings 2260 and 2262, in this embodiment having a substantially arc shapes and provided with slots 2210 and 2212. Applying pressure to the collar in the directions of external slots 2210 and 2212, as indicated by arrows 2295, collapses the hinged portion of collar 2200 toward the shaft and clamps the shaft thus arresting motion, both rotational and axial (around the shaft and along the shaft). As in the prior Figures, counterbore(s) may be provided to accept a pushrod or other means to apply the force.

Figure 23:
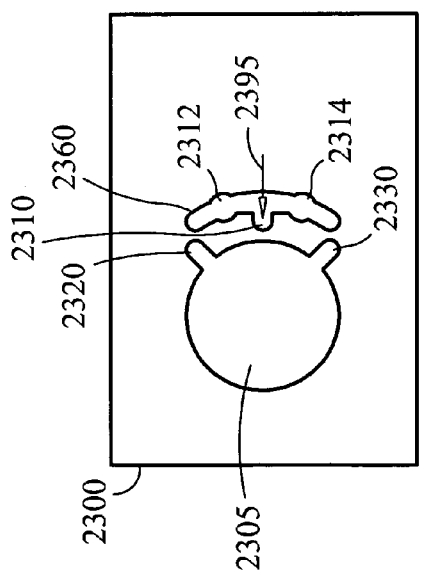
FIG. 23 is a top view of a seventeenth embodiment of the present invention where two circular openings have been drilled before the mechanism's kerfs were cut.

In many applications involving a shaft and housing, the part of the housing that is not disturbed in forming the mechanism constrains the shaft adequately. Where much of that portion of the housing has been relieved, as in FIG. 15, it may be desirable to keep the clamping mechanism from being forced open by the shaft. FIG. 23 is a top view of a seventeenth embodiment of the present invention where two circular openings have been drilled before the mechanism's kerfs were cut. (Other means may be used to obtain the same geometry.) In FIG. 23, note the two circular openings that may typically have been drilled before the mechanism's kerfs were cut. Inserting pins into those holes will keep the mechanism from being forced open.

If the holes are tapered, matching tapered slugs may be inserted. Pushing on the slugs may activate the mechanism. This makes the mechanism 3 dimensional because the force on the slugs acts outside the 2 dimensions of the traditional mechanism. If the holes are tapered and threaded, a threaded tapered plug such as a pipe plug may be inserted. Tightening this plug may activate the mechanism, or may be used to take up slack or provide drag or prevailing tension.

Referring to FIG. 23, collar 2300 includes internal slots 2320 and 2330 formed within opening 2305 of collar 2300, and external slot 2310, leaving three thinned areas in collar 2300 that act as hinges. Collar 2300 is provided with an opening 2360, in this embodiment having a substantially arc shape and provided with a slot 2310. Applying pressure to the collar by inserting conical pins or tapered or other threaded plugs or the like to openings 2312 and 2314, collapses the hinged portion of collar 2300 toward the shaft and clamps the shaft thus arresting motion, both rotational and axial (around the shaft and along the shaft). As in the prior Figures, counterbore(s) may be provided to accept a pushrod or other means to apply the force. Cylindrical pins placed into cylindrical holes 2312 and 3214 can prevent the hinged portion of the collar from being pushed away from the shaft.

In all of the above examples the housing was made of one piece. It is possible to apply this technology to a part made of more than one material, or in a situation wherein two or more parts make up the housing. In the latter case, a fairly large portion of the original housing might be cut out and a mechanism, made of a different material, but similar in shape and function to the moving parts in the examples described above, is inserted and fastened securely. This approach may be used to take advantage of the strength, coefficient of friction, fatigue resistance and so forth of a second material. The present invention may find a place in nanotechnology because the mechanism is very simple, generally two-dimensional, and is easy to produce by removing material.

Throughout the discussion of the present invention, the examples presented have the hinge points created either by the opposition of two slots that don't quite connect with one another or by the opposition of a slot with the interior of the housing (typically where the shaft fits), or by the opposition of the slot and an open area in the housing such as 460 in FIG. 4.

A slot may be typically a cut in a material, the sides of which are parallel. Slots were chosen for the geometries presented because they allow the creation of hinge points by removing the least material in a way that is consistent with common manufacturing practice. If, in a particular example of the invention, two or more hinged bodies have been created, largely by cutting slots in the housing, it is within the sprit and scope of the present invention that the same, or very similar geometry may also be created with modified slots, the sides of which are not parallel, and the contours of which may even be highly irregular.

Examples of such modified slots are used throughout the present application. For example opening 460 in FIG. 4 is essentially a combination of one traditional slot 410 and two modified slots one above 410 and the other below it, that participate in forming the outer hinge areas. Thus, the essential character of this invention rests with the creation of strategically located hinge areas. One of ordinary skill in the art can understand that creating a design similar to the designs presented herein, but using modified slots falls within the spirit and scope of the present invention.

Thus, whereas the hinge portions are described herein as being formed by slots, the term "slot" should not be construed as used in the present application to limit the spirit and scope of the present invention to a particular shape for the hinge portions or method of making thereof. The hinge points are the crux of the present invention, and may be formed by means other than slots, per se. Wide areas may be removed to form hinge portions, such that there are no slots as such. For example, instead of the two internal slots 520 and 530 in FIG. 5, a long swath of material could be removed to the right of a line tangent to the terminal curves in the two slots. In this way, the hinges could still be formed without creating discrete or obvious slots as such. Such geometry would reduce the curved pushing surface to a line contact located at the intersection of arrow 595 and opening 505 and perpendicular to the plane of the housing. In the above example fewer obvious slots are used. In other cases more slots than have been used in preferred embodiments may be used. For example, six slots, three distinct internal slots and three distinct external slots, may be used to form three hinges. Slots have been used in the preferred embodiment, as in manufacturing something like this it makes sense to remove as little material as possible. However, other methods of removing material to form hinges in different shapes may be used within the spirit and scope of the present invention.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A shaft clamping mechanism, comprising:
   a housing having a first opening for accepting a shaft and a second opening adjacent the first, defining a contiguous clamping portion of the housing;
   at least two first hinge points formed as narrowed body portions connecting the clamping portion to the housing, each first hinge point formed by a slot extending from the first opening of the housing; and
   at least one second hinge point formed as a narrowed portion of the clamping portion between the at least two first hinge points and on the same side of the first opening as the narrowed body portions of the at least two first hinge points, each second hinge point formed by a slot extending from the second opening;
   wherein, when pressure is applied to the clamping portion by a force exerted from the second opening, the clamping portion of the housing hinges along the at least two first hinge points and at least one second hinge point to apply radial pressure to a shaft to clamp the housing to a shaft.

2. The shaft clamping mechanism of claim 1, wherein, when pressure is applied to the housing in at least the direction of the at least one slot extending from the second opening, a portion of the housing hinges along the at least two first hinge points to apply pressure to a shaft to clamp the housing to a shaft.

3. The shaft clamping mechanism of claim 1, wherein the housing is substantially circular in shape to form a collar for clamping on a shaft.

4. The shaft clamping mechanism of claim 1, wherein the second opening is substantially arc shaped to conform to a shape of the first opening.

5. The shaft clamping mechanism of claim 1, wherein the first opening is tapered to fit a tapered shaft.

6. The shaft clamping mechanism of claim 1, wherein the at least one slot comprises two slots formed in the second opening, and wherein when pressure is applied to the housing in the direction of the two slots, a portion of the housing hinges along the at least two hinge points to apply pressure to a shaft to clamp the housing to a shaft.

7. The shaft clamping mechanism of claim 1, wherein, when pressure is applied to the housing in at least the direction perpendicular to the at least one slot extended from the second opening, a portion of the housing hinges along the at least two hinge points to apply pressure to a shaft to clamp the housing to a shaft.

8. The shaft clamping mechanism of claim 1, further comprising:
   a tab formed in the second opening; and
   a threaded hole, formed in the housing, for accepting a threaded member,
   wherein the threaded member contacts the tab to compress the at least one slot such that a portion of the housing hinges along the at least two first hinge points to apply pressure to a shaft to clamp the housing to a shaft.

9. The shaft clamping mechanism of claim 1, wherein the slots forming the at least two first hinge points are formed symmetrically in the first opening.

10. The shaft clamping mechanism of claim 1, wherein the at least two slots are formed asymmetrically in the first opening.

11. The shaft clamping mechanism of claim 1, wherein the second opening is formed symmetrically in relation to the first opening.

12. The shaft clamping mechanism of claim 1, wherein the second opening is formed asymmetrically in relation to the first opening.

13. The shaft clamping mechanism of claim 1, wherein the first opening includes at least one relieved portion to better constrain an out of tolerance shaft.

14. The shaft clamping mechanism of claim 13, wherein the relieved portion includes at least one v-block shaped relieved portion to better constrain an out of tolerance shaft.

15. The shaft clamping mechanism of claim 13, wherein the relieved portion includes at least double-arc-shaped relieved portion to better constrain an out of tolerance shaft.

16. The shaft clamping mechanism of claim 1, wherein the first opening includes at least one raised portion to better constrain an out of tolerance shaft.

17. The shaft clamping mechanism of claim 1, wherein the second opening is substantially linear in shape and parallel to bent portions of two bent slots.

18. The shaft clamping mechanism of claim 1, wherein the first opening is substantially round for accepting a round shaft.

19. The shaft clamping mechanism of claim 1, wherein the first opening is one or more of square, rectangular, hexagonal, polygonal or irregular shape for accepting a shaft having a corresponding cross-section.

20. The shaft clamping mechanism of claim 1, further comprising
a third opening opposite the second opening on an opposite side of the first opening for accepting a shaft, the third opening including another at least one second slot extending from the third opening.

21. The shaft clamping mechanism of claim 1, further comprising:
at least one circular opening formed in the second opening; and
at least one pin, corresponding to each at least one circular opening, wherein the at least one pin, when inserted into an at least one circular opening, prevents the shaft clamping mechanism from being forced open.

22. The shaft clamping mechanism of claim 21, wherein the at least one circular opening is tapered and the at least one pin forms a matching tapered slug, such that when a matching tapered slug is inserted into the at least one circular opening, pushing on the matching tapered slug applies pressure to the housing, and a portion of the housing hinges along the at least two first hinge points to apply pressure to a shaft to clamp the housing to a shaft.

* * * * *